United States Patent Office 2,918,491
Patented Dec. 22, 1959

2,918,491

SALICYLIC ACID AND ESTERS OF SALICYLIC ACID

Robert W. Radue, Webster Groves, Mo., assignor to Monsanto Chemical Company, St. Louis, Mo., a corporation of Delaware No Drawing. Application March 18, 1957
Serial No. 646,550

6 Claims. (Cl. 260—474)

This invention relates to salicylic acid and esters of salicylic acid stabilized by the presence of a minor proportion of ortho-phosphoric acid.

Salicylic acid and esters of salicylic acid, such as methyl salicylate, glycol monosalicylate, and phenyl salicylate, are extensively used in flavorings, perfumes, and pharmaceuticals. In general, these compounds are colorless in the pure form, and it is desirable that they remain clear and colorless, particularly for food and pharmaceutical uses. However, industry has a problem of producing and maintaining these esters as colorless compounds, especially under storage conditions. In general, iron, rust, or other iron-bearing materials are the principal causes of discoloration of salicylic acid and its esters. When contacted with iron, rust and other iron-bearing materials, these compounds develop a pink or pinkish discoloration. Even though a small amount of said iron, rust or iron-bearing materials is present, compared with the amount of salicylic acid or ester of salicylic acid which is present, the undesirable pink color readily develops. There are many chemical compounds which have been proposed and commercially used as stabilizing agents to inhibit such discoloration of salicylic acid and salicylate esters, however the disadvantages of many of the prior stabilizing agents are that they have a limited use, are incompatible with the end use of the compounds, cause deterioration of these compounds, and do not have a permanent stabilizing effect, i.e., the color is removed initially but redevelops upon storage.

It is therefore an object of this invention to provide a stabilizing agent for salicylic acid and salicylate esters which not only completely removes any discoloration initially present in these compounds, but which also inhibits indefinitely the reappearance of the color, does not cause deterioration of these compounds, and is compatible with the end use of these compounds, particularly when such end use is as a pharmaceutical or food product ingredient. These objects are accomplished by adding to the salicylic acid or salicylate ester, a minor proportion of ortho-phosphoric acid sufficient to stabilize the compound or mixture against discoloration. Generally, a minor proportion of ortho-phosphoric acid within the range of about 40 to 100 p.p.m. is adequate, however in most cases it is necessary to add at least 10 p.p.m., but it is seldom necessary to add more than 1,000 p.p.m.

The invention will become more evident from the following examples:

Example 1

To a quantity of ethylene glycol monosalicylate having a pink discoloration and a crystallizing point of 26° C., there was added 85% ortho-phosphoric acid in a quantity which gave a concentration of about 70 p.p.m. of 100% ortho-phosphoric acid in said glycol monosalicylate. The pink color disappeared completely and the crystallizing point remained at 26° C. Upon standing at room temperature for about three weeks, the glycol monosalicylate was still colorless and the crystallizing point remained at 26° C.

Example 2

A portion of the stabilized glycol monosalicylate described in Example 1, containing about 70 p.p.m. of ortho-phosphoric acid, after standing for one month at room temperature, was then placed in an oven and maintained at elevated temperatures within the range of 50-55° C. for one month. At the end of the first week this material remained colorless and had a crystallizing point of 26° C. At the end of the third week, and also at the end of one month, no color had reappeared and the crystallizing point was 25.6° C. and 25.5° C., respectively.

Example 3

To a portion of methyl salicylate having a pink color and a crystallizing point of −8.3° C., 85% ortho-phosphoric acid was added in a quantity sufficient to give a 100% phosphoric acid concentration of about 43 p.p.m. The pink color disappeared completely and the crystallizing point was unchanged. Upon standing at room temperature for about one month, the methyl salicylate remained colorless.

Example 4

Experiments similar to Examples 1 and 3 were conducted wherein the concentration of phosphoric acid was varied from about 40 p.p.m. to about 100 p.p.m. In all cases the color did not reappear and the crystallizing point remained substantially the same as the crystallizing point of the original material.

Example 5

Glycol monosalicylate identical to that used in Example 1 was treated with 500 p.p.m. of a commercially available iron sequestering agent, composed primarily of sodium N-(beta-hydroxy ethyl)-ethylenediamine triacetate, which is a frequently recommended and used color stabilizing agent for iron contamination. The pink color disappeared initially, but, upon standing at room temperature, the color gradually reappeared.

Example 6

A quantity of glycol disalicylate having a pink color was dissolved in heated ethanol. To this colored solution was added a sufficient quantity of 85% ortho-phosphoric acid to provide a 47 p.p.m. concentration of 100% phosphoric acid. The solution became colorless and, upon cooling the solution, colorless crystallized glycol disalicylate was recovered which did not discolor again even upon prolonged storage.

Example 7

A composition consisting essentially of phenyl salicylate and a minor proportion, amounting to about 100 p.p.m., of ortho-phosphoric acid was intentionally contaminated with flecks of rust without the phenyl salicylate developing any of the usual discoloration indicative of iron contamination.

From the above examples, it is seen that this invention provides a superior method for stabilizing salicylic acid and salicylate esters against discoloration, particularly discoloration induced by the presence of iron or iron-containing materials.

What is claimed is:

1. A composition consisting essentially of a compound selected from salicylic acid and esters thereof and, as a stabilizer therefor, ortho-phosphoric acid in an amount up to about 1,000 parts per million parts of said compound.

2. A composition consisting essentially of salicylic acid and, as a stabilizer therefor, ortho-phosphoric acid in an amount up to about 1,000 parts per million parts of salicylic acid.

3. A composition consisting essentially of an ester of salicylic acid and, as a stabilizer therefor, ortho-phosphoric acid in an amount up to about 1,000 parts per million parts of salicylic acid.

4. A composition consisting essentially of glycol monosalicylate and, as a stabilizer therefor, ortho-phosphoric acid in an amount up to about 1,000 parts per million parts of glycol monosalicylate.

5. A composition consisting essentially of methyl salicylate and, as a stabilizer therefor, ortho-phosphoric acid in an amount up to about 1,000 parts per million parts of methyl salicylate.

6. A composition consisting essentially of phenyl salicylate and, as a stabilizer therefor, ortho-phosphoric acid in an amount up to about 1,000 parts per million parts of phenyl salicylate.

References Cited in the file of this patent

UNITED STATES PATENTS

| | | |
|---|---|---|
| 1,606,171 | Mills | Nov. 9, 1926 |
| 1,872,700 | Dreyfus | Aug. 23, 1932 |
| 2,248,112 | Neustein | July 8, 1941 |
| 2,822,378 | Bader | Feb. 4, 1958 |